July 14, 1942.  F. H. MUELLER ET AL  2,289,720
LUBRICATED VALVE
Filed Jan. 6, 1940
Fig. 1.
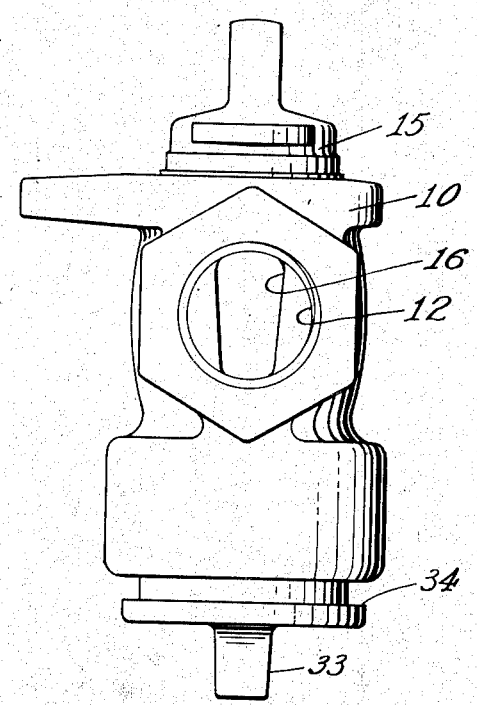
Fig. 2.
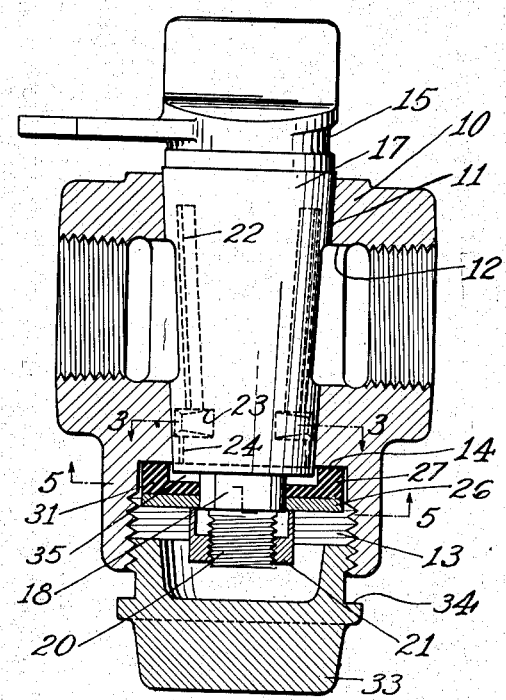
Fig. 3.
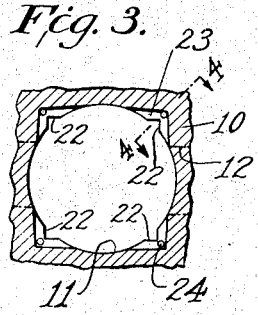
Fig. 4.
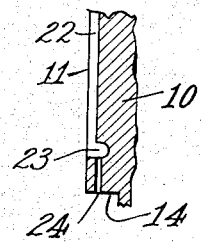
Fig. 5.
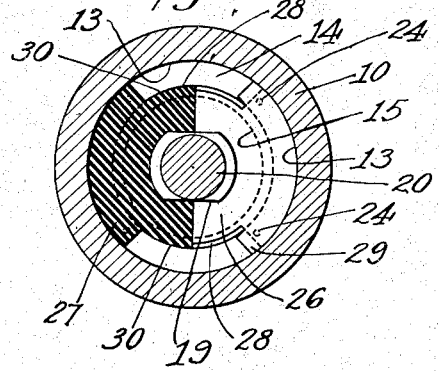
Fig. 6.
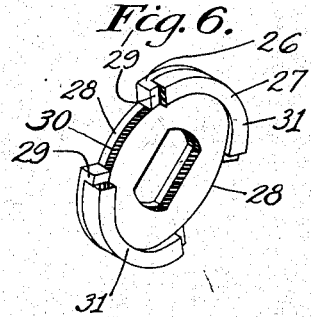
Fig. 7.
Inventor
Frank H. Mueller
Walter J. Bowan
By Cushman, Darby & Cushman
Attorney Patented July 14, 1942

2,289,720

UNITED STATES PATENT OFFICE 2,289,720

LUBRICATED VALVE

Frank H. Mueller and Walter J. Bowan, Decatur, Ill., assignors to Mueller Co., Decatur, Ill., a corporation of Illinois Application January 6, 1940, Serial No. 312,788

5 Claims. (Cl. 251—93)

The present invention relates to lubricated valves.

The principal objects of the invention are to provide a valve which is efficient in sealing action, and which valve is also of such construction that pressure can readily be applied to the plug thereof to lift the same from its seat in the event that the valve becomes seized in either open or closed position.

Other objects and advantages of the invention will be apparent from the following drawing, wherein:

Figure 1 is a side elevation of the valve.

Figure 2 is a longitudinal central section through the valve.

Figure 3 is a fragmentary transverse section on the line 3—3 of Figure 2 with the plug removed.

Figure 4 is a fragmentary section on the line 4—4 of Figure 3.

Figure 5 is a transverse sectional view on the angled line 5—5 of Figure 2.

Figure 6 is a perspective view showing the washer structure used in the valve of Figures 1 to 5.

Figure 7 is a view similar to Figure 5, but showing a modified form of washer structure.

Referring to Figures 1 to 6, the numeral 10 indicates a valve casing member including a tapered seat 11 having a flow passageway 12 intersecting the same. The reduced end of the seat 11 opens to a chamber 13 which is of sufficiently large diameter that a shoulder 14 will be provided in the chamber about the reduced end of the seat 11. A plug 15 of tapered form including a flow passageway 16 is mounted in the seat 11, the seating surface 17 of the plug 15 being sufficiently long in an axial direction that it will contact with every portion of the seat 11 of casing member 10.

The reduced end of the plug 15 includes a shank 18 extending into the chamber 13 and which is flattened as indicated at 19 to form a key. Beyond the key 19, the extension 18 is threaded as indicated at 20 to receive a nut 21. The seating surface 11 of casing member 10 is provided with a plurality of longitudinally extending grooves 22. As best shown in Figure 3, four such grooves are provided in the seating surface, preferably spaced 90° apart and with two grooves in each portion of the seating surface 11 between the intersecting ends of the flow passageway 12. By this arrangement, when the plug 15 is rotated to closed position, each end of the flow passage 16 of the plug will be between two of the grooves 22.

As best shown in Figure 2, the grooves 22 are of less length than the seating surface 11 of casing member 10.

As illustrated in Figures 2, 3 and 4, the ends of the grooves 22 adjacent the reduced end of the seating surface 11 are circumferentially enlarged, as indicated at 23, and, as particularly illustrated in Figure 4, the enlargements 23 are somewhat deeper, in a direction radially of the seating surface 11, than the grooves 22. A port 24 extends from each enlargement 23 to the shoulder 14 of chamber 13.

The grooves 22 and their enlargements 23 are preferably formed in the casing member during casting, and the ports 24 are subsequently drilled. The enlargements 23 insure that the drilled holes 24 will communicate with the grooves 22.

A washer structure preferably including a metal washer 26 and a resilient washer 27 is mounted on the keyed portion 19 of plug 15. The metal washer 26 is provided with two peripherally extending and diametrically opposite cutouts 28 and upwardly extending tangs 29 are formed at the ends of these cutout portions. The resilient washer 27 is preferably formed of rubber of proper resiliency and includes cutouts 30 which correspond to the cutouts 28 of the metal washer except that, as shown in Figure 6, the rubber washer cutouts are somewhat longer circumferentially in order that the tangs 29 will embrace the edges of the cutouts of the resilient washer.

The resilient washer also includes upwardly projecting shoulders 31 which extend about the edge of the rubber washer between its cutout portions. These shoulders are of greater height than the tangs 29. The washers are provided with aligned apertures of keyed form to enable them to be secured upon the key portion 19 of stud 18, the resilient washer being arranged to bear upon the shoulder 14 of chamber 13. The nut 21 is adapted to hold the washers in such position that the shoulders 31 of the resilient washer will bear firmly upon the shoulder 14 of chamber 13, as shown in Figure 2.

A closure plug 33 is threaded in the outer end of chamber 13 to close the same and to enable pressure to be applied to grease within the chamber. A shoulder 34 is preferably provided upon the closure 33 in order to limit inward movement of the same so that it will not contact with the washer structure.

The groves 22 of casing member 10 will preferably be filled with grease prior to its installation in a line and, either then or subsequently, the chamber 13 will be filled with grease.

It will be obvious that during open position of the valve, fluid may move through the passageways 12 and 16 and that during closed position of the valve leakage past the same will be entirely prevented by reason of the fact that a grease filled groove 22 is provided between each end of the passageway 12 and the adjacent end of the passageway 16 in the plug 15. Also, during both open and closed positions of the plug 15, the shoulders 31 of the resilient washer 27 will bear upon and seal the mouths of the passages 24 which communicate with the grooves 22. However, during rotation of the plug 15 from open to closed position, the two passages 24 which will not have their corresponding grooves 22 open to the flow passageway will communicate with the lubricant chamber 13 through the cutouts 28 in the washer structure.

In the event that the valve becomes seized or difficult to rotate, it is only necessary to apply pressure to the lubricant within the chamber 13 by inward rotation of the closure plug 33. This pressure applied to the grease will act upon the reduced end of the plug 15 through the space 35 between that surface of the plug and the opposed surface of the body of resilient washer 27 to lift the plug in its seat. Such lifting movement is permitted by reason of the resiliency of washer 27. At the same time, because the passages 24 will be sealed by the washer shoulders 31, the entire pressure of the grease will be exerted to lift the plug. The plug may then be rotated and when the two ports 24 which will be out of communication with the flow passageways during turning movement of the plug are uncovered by the washer structure, grease will move into those ports 24 and upwardly into the corresponding grooves 22 so as to relieve the pressure in the chamber 13 to enable the plug to reseat.

Figure 7 shows a modified form of washer structure which comprises a metal washer 26' and a resilient washer 27' including aligned arcuately extending and diametrically opposite cutouts 28'. However, the cutouts 28' of the Figure 7 washer are somewhat longer than those of the Figure 6 washer with the result that the ports 24 which open to the shoulder 14 of chamber 13 will not be entirely covered during either open or closed position of the plug. As best shown in Figure 7, when the Figure 7 washer is applied, the mouths of the ports 24 will be substantially opposite the edges of the shoulder 31' of the resilient washer 27' and hence will not be entirely covered.

The form of washer disclosed in use in Figure 7 is desirable with valves intended for use in installations where less pressure is required to raise the valve in its seat, or where the fluid moving through the valve is not apt to escape along the seating surface of the valve. That is, when pressure is applied to the plug 15 of Figure 7 by rotating the closure 33, in either open or closed position of the valve equipped as in Figure 7, less pressure will be applied to the reduced end of the plug 15 by the grease because a portion of the pressure will act upwardly through the ports 24 and in the corresponding grooves 22. Grease pressure in the grooves 22 will, of course, act upwardly to some extent to lift the valve but will not have as marked an axial lifting force as the grease acting directly against the reduced end of the plug. Also, since the ports 24 are not sealed from the lubricant chamber 13, the washer structure of Figure 7 cannot be used where the fluid moving through the line is apt to move along the valve seating surface, either because of its pressure or because of other causes.

It will be obvious that during rotation of the plug 15 equipped with the washer structure of Figure 7, the shoulders 31' of the resilient washer 27' will close the two ports 24 which communicate with the two grooves 22 which will be opened to the flow passageway of the valve during such rotation.

The structures of the present invention are readily adaptable to valves of all sizes.

It will be understood that the terminology used in the specification is for purposes of description, the scope of the invention being indicated in the claims.

We claim:

1. A valve comprising a casing member having a passageway for flow of fluid and a seat formed transversely of the passageway, a plug member rotatably disposed in the seat and having a fluid passageway therethrough, the casing member having grooves therein extending longitudinally of the seating surface, a lubricant chamber at one end of the casing member seat, said longitudinally extending grooves terminating at a point on the seating surface spaced from said chamber, separate ports formed entirely within the casing member extending from said chamber to each of the longitudinally extending grooves so that a groove and its associated port will form a grease passage, each port opening to an area of the lubricant chamber separate from the seating surface, and a control member including a bearing surface positioned entirely outside of the seating surface to bear solely upon said area, the entire mouth of each port opening to said area being laterally spaced from the seating surface to be independent of the latter and to make said grease passages independent of each other so that during rotation of the control member with the plug the grease passages which are open to the fluid passageway will be isolated from the other grease passages and the grease chamber.

2. A valve as defined in claim 1 wherein the control member is resilient.

3. A valve as defined in claim 1 including means to exert pressure upon the lubricant in the lubricant chamber to urge said control member against the mouths of the ports.

4. A valve as defined in claim 1 wherein the plug and casing member seat are tapered, and the control member is resilient and positioned at the small end of the casing member seat.

5. A valve as defined in claim 1 wherein the control member comprises a metal backing element and a resilient element interposed between the backing element and the mouths of the ports, both of said elements having diametrically opposite cut-out portions on their peripheries.

FRANK H. MUELLER.
WALTER J. BOWAN.